US012810123B2

(12) United States Patent
Shrivastava et al.

(10) Patent No.: US 12,810,123 B2
(45) Date of Patent: Nov. 24, 2026

(54) NEURAL GRAPH REVEALERS

(71) Applicant: Microsoft Technology Licensing, LLC, Redmond, WA (US)

(72) Inventors: Harsh Shrivastava, Redmond, WA (US); Urszula Stefania Chajewska, Camano Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 832 days.

(21) Appl. No.: 18/313,907

(22) Filed: May 8, 2023

(65) Prior Publication Data

US 2024/0281643 A1 Aug. 22, 2024

Related U.S. Application Data

(60) Provisional application No. 63/446,662, filed on Feb. 17, 2023.

(51) Int. Cl.
*G06N 3/047* (2023.01)

(52) U.S. Cl.
CPC .................................... *G06N 3/047* (2023.01)

(58) Field of Classification Search
CPC ...................................................... G06N 3/047
See application file for complete search history.

(56) References Cited

U.S. PATENT DOCUMENTS

| | | | | |
|---|---|---|---|---|
| 10,402,726 | B1 * | 9/2019 | Moore | G06N 3/088 |
| 10,463,312 | B2 | 11/2019 | Bhattacharya et al. | |
| 11,087,879 | B2 | 8/2021 | Shrivastava et al. | |
| 11,392,829 | B1 * | 7/2022 | Pool | G06N 3/0495 |
| 11,620,901 | B1 * | 4/2023 | Symes | G08G 1/052 701/118 |
| 2020/0387148 | A1 * | 12/2020 | Ghosh | G06F 17/18 |
| 2020/0387782 | A1 * | 12/2020 | Hegde | G06N 3/047 |
| 2020/0394526 | A1 * | 12/2020 | Kim | G06N 3/0455 |
| 2021/0158168 | A1 * | 5/2021 | Ahmad | G06N 3/084 |
| 2021/0303993 | A1 * | 9/2021 | Saeedi | H03M 7/3077 |
| 2021/0363969 | A1 * | 11/2021 | Egedal | F03D 7/046 |
| 2022/0156759 | A1 * | 5/2022 | Chauhan | G06N 20/00 |

(Continued)

OTHER PUBLICATIONS

Zheng, et al., "Learning sparse nonparametric DAGs", In Proceedings of the International Conference on Artificial Intelligence and Statistics, Jun. 3, 2020, 11 Pages.

(Continued)

*Primary Examiner* — David E Choi
(74) *Attorney, Agent, or Firm* — Ray Quinney & Nebeker P.C.; James Bullough

(57) ABSTRACT

The present disclosure relates to recovering a sparse feature graph based on input data having a collection of samples and associated features. In particular, the systems described herein utilize a fully connected neural network to learn a regression of the input data and determine direct connections between features of the input data while the neural network satisfies one or more sparsity constraints. This regression may be used to recover a feature graph indicating direct connections between the features of the input data. In addition, the feature graph may be presented via an interactive presentation that enables a user to navigate nodes and edges of the graph to gain insights of the input data and associated features.

20 Claims, 10 Drawing Sheets

(56) References Cited

U.S. PATENT DOCUMENTS

| | | | | |
|---|---|---|---|---|
| 2022/0261652 | A1* | 8/2022 | Asad | G06F 18/2136 |
| 2023/0010142 | A1* | 1/2023 | Zafrir | G06N 3/045 |
| 2023/0081531 | A1* | 3/2023 | Koike Akino | G06N 3/0495<br>706/15 |
| 2023/0086724 | A1* | 3/2023 | Wu | G06Q 10/1053 |
| 2023/0124177 | A1* | 4/2023 | Jayakumar | G06N 3/09<br>706/15 |
| 2024/0111988 | A1* | 4/2024 | Shrivastava | G06N 3/08 |
| 2024/0112000 | A1* | 4/2024 | Shrivastava | G06N 3/08 |
| 2024/0281643 | A1* | 8/2024 | Shrivastava | G06N 3/084 |
| 2024/0419494 | A1* | 12/2024 | Kim | G06N 3/063 |
| 2024/0419995 | A1* | 12/2024 | Chajewska | G06N 5/022 |

OTHER PUBLICATIONS

Zhang, et al., "D-Vae: A Variational Autoencoder for Directed Acyclic Graphs", In Journal of Advances in Neural Information Processing Systems, vol. 32, Dec. 8, 2019, 13 Pages.

Zheng, et al., "DAGs with No Tears: Continuous Optimization for Structure Learning", In Journal of Advances in Neural Information Processing Systems, vol. 31, Dec. 3, 2018, 12 Pages.

"Centers for Disease Control and Prevention", In National Center for Health Statistics, Jan. 26, 2023, 4 Pages.

Aluru, et al., "Engrain: A Supervised Ensemble Learning Method for Recovery of Large-Scale Gene Regulatory Networks", In Journal of Bioinformatics, vol. 38, Issue 5, Dec. 9, 2021, pp. pp. 1312-1319.

Banerjee, et al., "Model Selection Through Sparse Maximum Likelihood Estimation for Multivariate Gaussian or Binary Data", In Journal of Machine Learning Research, vol. 9, Jun. 1, 2008, pp. 485-516.

Belilovsky, et al., "Learning to Discover Sparse Graphical Models", In Proceedings of the International Conference on Machine Learning, Jul. 17, 2017, 9 Pages.

Bhattacharya, et al., "ICU mortality prediction: a classification algorithm for imbalanced datasets", In Proceedings of the AAAI Conference on Artificial Intelligence, vol. 31, No. 1, Feb. 12, 2017, pp. 1288-1294.

Caruana, et al., "Intelligible Models for HealthCare: Predicting Pneumonia Risk and Hospital 30-day Readmission", In Proceedings of 21st ACM SIGKDD International Conference on Knowledge Discovery and Data Mining, Aug. 10, 2015, pp. 1721-1730.

Chawla, et al., "SMOTE: Synthetic Minority Over-Sampling Technique", In Journal of Artificial Intelligence Research, vol. 16, Jun. 1, 2002, pp. 321-357.

Chickering, et al., "Learning Bayesian Networks is NP-Complete", In Journal of Learning from data: Artificial Intelligence and statistics V, Nov. 1994, 23 Pages.

Fernandez, et al., "Smote for Learning from Imbalanced Data: Progress and Challenges, Marking the 15-year Anniversary", In Journal of Artificial Intelligence Research, vol. 61, Apr. 20, 2018, pp. 863-905.

Frankle, et al., "The Lottery Ticket Hypothesis: Finding Sparse, Trainable Neural Networks", In repository of arXiv:1803.03635v4, Nov. 27, 2018, 39 Pages.

Friedman, et al., "Sparse Inverse Covariance Estimation with the Graphical Lasso", In Journal of Biostatistics, vol. 9, Issue 3, Dec. 12, 2007, pp. 432-441.

Gallicchio, et al., "Deep randomized neural networks", In Recent Trends in Learning From Data: Tutorials from the INNS Big Data and Deep Learning Conference, Apr. 4, 2020, pp. 43-68.

Gogate, et al., "Learning Efficient Markov Networks", In Journal of Advances in Neural Information Processing Systems, vol. 23, Dec. 6, 2010, 9 Pages.

Greenewald, et al., "Tensor graphical lasso (TeraLasso)", In Journal of the Royal Statistical Society: Series B, vol. 81, Issue 5, Oct. 10, 2019, pp. 901-931.

Guillot, et al., "Iterative Thresholding Algorithm for Sparse Inverse Covariance Estimation", In Journal of Advances In Neural Information Processing Systems, vol. 25, Dec. 6, 2012, 9 Pages.

Hallac, et al., "Network Inference via the Time-Varying Graphical Lasso", In Proceedings of the 23rd ACM SIGKDD International Conference on Knowledge Discovery and Data Mining, Aug. 13, 2017, pp. 205-213.

Haury, et al., "TIGRESS: Trustful Inference of Gene REgulation using Stability Selection", In Journal of BMC systems biology, vol. 6, Issue 1, Nov. 22, 2012, 17 Pages.

Heckerman, et al., "Learning Bayesian Networks: The Combination of Knowledge and Statistical Data", In Journal of Machine learning, vol. 20, Sep. 1995, pp. 197-243.

Hsieh, et al., "QUIC: Quadratic Approximation for Sparse Inverse Covariance Estimation", In Journal of Machine Learning Research, vol. 15, Issue, Oct. 1, 2014, pp. 2911-2947.

Huynh-Thu, et al., "Inferring Regulatory Networks from Expression Data Using Tree-Based Methods", In Journal of Plos one, vol. 5, Issue 9, Sep. 28, 2010, 10 Pages.

Koller, et al., "Probabilistic graphical models: principles and techniques", Published by MIT press, Jul. 31, 2009, 16 Pages.

Lee, et al., "Efficient Structure Learning of Markov Networks using L1-Regularization", In Journal of Advances in neural Information processing systems, vol. 19, Dec. 4, 2006, 8 Pages.

Lou, et al., "Accurate intelligible models with pairwise interactions", In Proceedings of the 19th ACM SIGKDD International Conference on Knowledge Discovery and Data Mining, Aug. 11, 2013, pp. 623-632.

Margolin, et al., "ARACNE: An Algorithm for the Reconstruction of Gene Regulatory Networks in a Mammalian Cellular Context", In Journal of BMC bioinformatics, vol. 7, Mar. 2006, 15 Pages.

Moerman, et al., "GRNBoost2 and Arboreto: efficient and scalable inference of gene regulatory networks", In Journal of Bioinformatics, vol. 35, Issue 12, Nov. 15, 2018, pp. 2159-2161.

Pearl, et al., "The Book of Why the New Science of Cause and Effect", In Book of Basic books, Nov. 11, 2018, 12 Pages.

Pu, et al., "Learning to learn graph topologies", In Journal of Advances in Neural Information Processing Systems, vol. 34, Dec. 6, 2021, 14 Pages.

Rajbhandari, et al., "AntMan: Sparse Low-Rank Compression to Accelerate RNN inference", In Repository of arXiv:1910.01740, Oct. 2, 2019, 10 Pages.

Ramanujan, et al., "What's hidden in a randomly weighted neural network?", In Proceedings of the IEEE/CVF Conference on Computer Vision and Pattern Recognition, Jun. 13, 2020, p. 11893 -11902.

Sande, et al., "A scalable Scenic workflow for single-cell gene regulatory network analysis", In Journal of Nature Protocols, vol. 15, Issue 7, Jul. 2020, pp. 2247-2276.

Scutari, Marco, "Learning Bayesian Networks with the bnlearn R Package", In Journal of Statistical Software, vol. 35, Jul. 16, 2010, 22 Pages.

Shrivastava, et al., "A deep learning approach to recover conditional independence graphs", In Proceedings of NeurIPS 2022 Workshop: New Frontiers in Graph Learning, Nov. 28, 2022, 16 Pages.

Shrivastava, et al., "Classification with Imbalance: A Similarity-Based Method for Predicting Respiratory Failure", In Proceedings of IEEE International Conference on Bioinformatics and Biomedicine, Nov. 9, 2015, pp. 707-714.

Shrivastava, et al., "Cooperative Neural Networks (Conn): Exploiting Prior Independence Structure For Improved Classification", In Repository of arXiv:1906.00291v1, Jun. 1, 2019, 14 Pages.

Shrivastava, et al., "Echo State Speech Recognition", In Proceedings of IEEE International Conference on Acoustics, Speech and Signal Processing (ICASSP), Jun. 6, 2021, pp. 5669-5673.

Shrivastava, et al., "GLAD: Learning sparse graph recovery", In Repository of arXiv:1906.00271, Dec. 21, 2019, 22 Pages.

Shrivastava, et al., "GRNUlar: A Deep Learning Framework for Recovering Single-Cell Gene Regulatory Networks", In Journal of Computational Biology, vol. 29, Issue 1, Jan. 1, 2022, pp. 27-44.

Shrivastava, et al., "GRNUlar: Gene regulatory network reconstruction using unrolled algorithm from single cell RNA-sequencing data.", In Repository of bioRxiv, Apr. 25, 2020, 10 Pages.

(56) References Cited

OTHER PUBLICATIONS

Shrivastava, et al., "Methods for recovering conditional independence graphs", In Repository of arXiv:2211.06829, Nov. 13, 2022, 14 Pages.
Shrivastava, et al., "Methods For Recovering Conditional Independence Graphs: A Survey", In Repository of arXiv:2211.06829v1, Nov. 13, 2022, pp. 1-14.
Shrivastava, et al., "Neural Graph Revealers", In Repository of arXiv:2302.13582v2, Feb. 28, 2023, 13 Pages.
Shrivastava, et al., "Neural Graphical Models", In Repository of arXiv:2210.00453v1, Oct. 2, 2022, pp. 1-16.
Shrivastava, Harsh, "On Using Inductive Biases for Designing Deep Learning Architectures", In Thesis of Georgia Institute of Technology, May 2021, 135 Pages.
Shrivastava, et al., "uGLAD: Sparse graph recovery by optimizing deep unrolled networks", In Repository of arXiv:2205.11610, Oct. 12, 2022, pp. 1-16.
Singh, et al., "An Algorithm for the Construction of Bayesian Network Structures from Data", In Proceedings of the 9th Conference on Uncertainty in Artificial Intelligence, Jan. 1, 1993, pp. 259-265.
Städler, et al., "Missing values: sparse inverse covariance estimation and an extension to sparse regression.", In Journal of Statistics and Computing, vol. 22, Jan. 2012, pp. 219-235.
Wang, et al., "The Sylvester Graphical Lasso (SyGlasso)", In Proceedings of the International Conference on Artificial Intelligence and Statistics, Jun. 3, 2020, 10 Pages.
Williams, Donaldr. , "Beyond Lasso: A Survey of Nonconvex Regularization in Gaussian Graphical Models", In Repository of PsyArXiv, Nov. 9, 2020, 25 Pages.
Yu, et al., "DAG-GNN: Dag Structure Learning with Graph Neural Networks", In Proceedings of the International Conference on Machine Learning, May 24, 2019, 10 Pages.
Yu, et al., "Using Bayesian network inference algorithms to recover molecular genetic regulatory networks", In Proceedings of International Conference on Systems Biology, Dec. 2002, 10 Pages.
International Search Report and Written Opinion received for PCT Application No. PCT/US2024/015084, Jun. 5, 2024, 13 pages.
Shrivastava, et al., "Neural Graphical Models", In Repository of arXiv:2210.00453v1, Oct. 2, 2022, 16 Pages.
International Preliminary Report on Patentability received for PCT Application No. PCT/US2024/015084, mailed on Aug. 28, 2025, 09 pages.

* cited by examiner

400

Algorithm 1: Learning NGRs

Function `NGR-training(`$X$`)`:

- $f_{\mathcal{W}^0} \leftarrow$ Fully connected MLP
- For $e = 1, \cdots, E$ do
  - $\mathrm{Xb} \leftarrow X$ (sample a batch)
  - $\mathcal{L} = \sum_{k=1}^{M} \left\| \mathrm{Xb}_{\mathcal{D}}^{k} - f_{\mathcal{W},\mathcal{B}}(\mathrm{Xb}_{\mathcal{D}}^{k}) \right\|^{2}$
    $+\lambda \left\| \mathrm{sym}(S_{nn}) * S_{\mathrm{diag}} \right\|_{1}$
    $+\gamma \left\| \mathrm{sym}(S_{nn}) \right\|_{1}$
  - $\mathcal{W}^{e}, \mathcal{B}^{e} \leftarrow$ backprop $\mathcal{L}$ & update using 'adam' optimizer
- $\{\mathcal{W}^{E}\} \leftarrow f_{\mathcal{W},\mathcal{B}}^{E}$
- $\mathcal{G} \leftarrow \mathrm{sym}\left(\prod_{l=1}^{L} |W_{l}^{E}|\right)$
- return $\mathcal{G}, f_{\mathcal{W}^{E}}$

FIG. 4

500

| | mager | dmar | precare | bmi | wtgain | combgest | ... |
|---|---|---|---|---|---|---|---|
| 1 | 23 | 0 | 4 | 27.9 | 0 | 43 | ... |
| 2 | 24 | 0 | 4 | 19.3 | 19 | 40 | ... |
| 3 | 23 | 1 | 7 | 20.2 | 21 | 40 | ... |
| 4 | 25 | 0 | 4 | 25.1 | 11 | 38 | ... |
| 5 | 27 | 0 | 4 | 23.1 | 34 | 39 | ... |
| 6 | 23 | 1 | 5 | 20.7 | 17 | 41 | ... |
| ... | ... | ... | ... | ... | ... | ... | ... |

FIG. 5A

NEURAL GRAPH REVEALERS

CROSS-REFERENCE TO RELATED APPLICATIONS

This application is related to and claims priority to U.S. Provisional Patent Application No. 63/446,662, filed Feb. 17, 2023, the entirety of which is hereby incorporated by reference.

BACKGROUND

Recent years have seen a significant increase in the use of computing devices (e.g., mobile devices, personal computers, server devices) to create, store, analyze, and present data from various sources. Indeed, tools and applications for collecting, analyzing, and presenting data are becoming more and more common. These tools provide a variety of features for displaying data about various entities. In many cases, these tools attempt to generate and provide a display of a graph showing features of data and, more specifically relationships between various features within a collection of instances of data (e.g., samples of data).

As entities become more complex, however, conventional methods for collecting, analyzing, and presenting data have a number of limitations and drawbacks. For example, many conventional graph recovery approaches have difficulty in representing features of different data types. In addition, many conventional approaches struggle in achieving an optimal level of sparsity for samples of data having a large number of associated features. Further, different recovery models make assumptions that lead to inaccuracies in generating or otherwise recovering a graph that effectively represents a collection of data. Moreover, many techniques require a high level of user supervision in recovering an accurate representation of data.

These and other problems exist in recovering graphs that include an effective or otherwise useful representation of a collection of data (e.g., data samples).

BRIEF DESCRIPTION OF THE DRAWINGS

FIG. 4 illustrates an example algorithm for learning a sparse graphical model over the input data in accordance with one or more sparsity constraints.

FIGS. 5A-5B illustrate an example implementation in which a graph recovery system recovers a graph in accordance with one or more embodiments.

DETAILED DESCRIPTION

Figure 1:
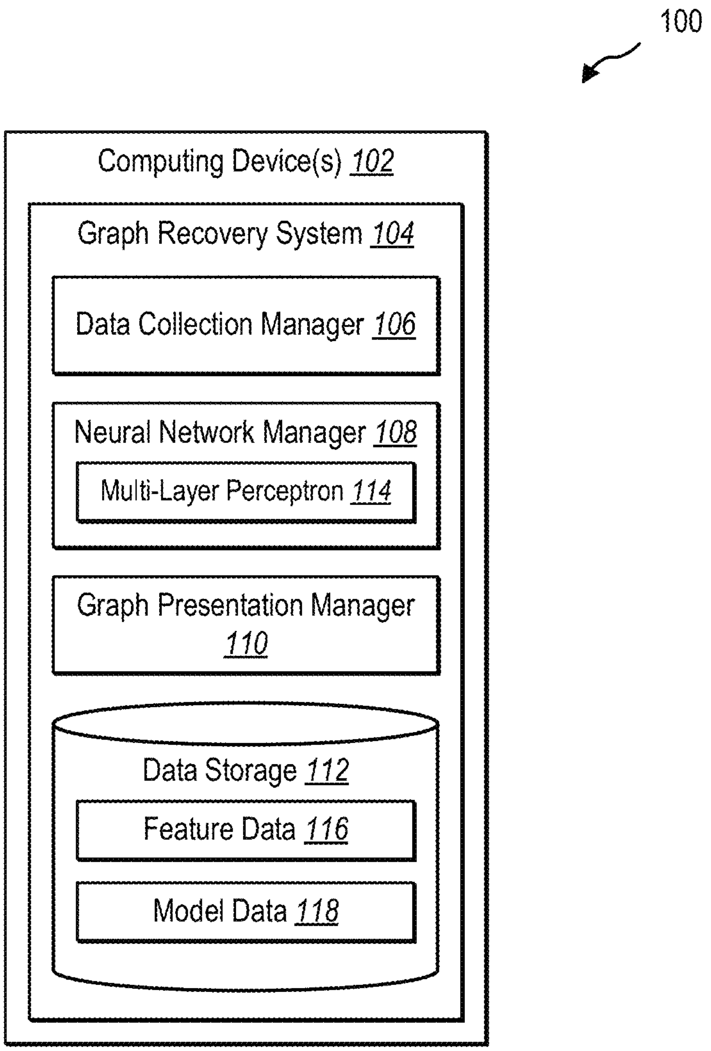
FIG. 1 illustrates an example environment including a computing device having a graph recovery system implemented thereon.

The present disclosure relates to systems, methods, and computer readable media for recovering a sparse feature graph based on input data having a collection of samples and associated features. In particular, one or more embodiments described herein utilize a fully connected neural network (NN) to learn a regression, with the nodes in both the input and output of the NN (e.g., a neural graph revealer or "NGR") representing the features present in provided input data, and determine direct connections between features of the input data while the network satisfies one or more sparsity constraints. This regression may be used to recover a feature graph indicating direct connections between the features of the input data. In addition, the feature graph may be presented via an interactive presentation that enables a user to navigate nodes and edges of the graph to gain insights of the input data and associated features.

As an illustrative example, one or more embodiments described herein relate to methods and systems for recovering undirected graphs. For instance, a graph recovery system may obtain data including a collection of samples and associated sample features. The graph recovery system may additionally identify a neural network designed to receive input features of a given set of samples and learn a regression with the input and output of the NGR being the same input features. The graph recovery system can additionally apply the neural network (e.g., a fully connected neural network, or fully connected multi-layer perceptron) to the collection of samples and associated sample features to learn a regression model that correlates a set of input features to a set of output features while satisfying one or more sparsity constraints. The graph recovery system may additionally generate an undirected graph representative of the collection samples indicating a set of correlations or dependencies between the sample features associated with the collection of samples.

The present disclosure provides a number of practical applications that provide benefits and/or solve problems associated with evaluating input data to determine dependencies (or direct connections) between features of the input data while the NGR satisfies one or more sparsity constraints. By way of example and not limitation, some of these benefits will be discussed in further detail below.

For example, by using a neural network to learn or otherwise fit a regression with the input and output of the NGR being the given input data, the graph recovery system generates a sparse graph in which features are accurately connected to one another. That is, feature Xi is not directly connected to feature Xj if and only if features Xi and Xj are conditionally independent given all other features in the distribution learned based on the input dataset. Indeed, where many conventional graph recovery approaches, such as a graphical lasso recovery method, make simplifying assumptions (e.g., a gaussian distribution of features), the graph recovery system can learn a sparse graphical model over the data regardless of distribution type and without limiting analysis of the input data to possibly over-simplifying assumptions. This provides more accurate connection data in the resulting graph while facilitating satisfaction of certain sparsity constraints.

In addition, by using a neural network to learn or otherwise fit the regression, the graph recovery system can generate a sparse graph for features that have a variety of data types. Indeed, where many conventional graph recovery approaches are limited to specific types of data (e.g., categorical, numerical, discrete, continuous), one or more embodiments of the graph recovery system described herein learn a sparse graphical model over distributions of features of a variety of data types. As will be discussed below, this approach allows the graph recovery system to avoid certain assumptions that causes a resulting graph to have inaccurate connection information, significantly limiting the utility of insights that would otherwise be gained from the recovered graph.

In addition to providing additional accuracy in the recovered graph, by applying one or more sparsity constraints, the graph recovery system reduces a number of edges/connections of the recovered graph to only include those connections that are determined to be directly connected. This sparsity is achieved while maintaining a rich and complex representation of the data that is provided as a result of applying a multi-layer neural network (e.g., a multi-layer perceptron) to the input data in a model or heuristic in which the regression of features may be learned while enforcing a selected sparsity restraint.

The approaches described herein provide a flexible and scalable approach to recovering graphs for a variety of data and for input data that has a robust number of features of similar or different types. As an example, by using a multi-layer perceptron and other neural networks that make use of matrix operations in learning a sparse graphical model over the data, additional processing units, like graphical processing units (GPUs), can be applied to the matrix operations, providing availability to additional processing resources that are generally available on computing devices for carrying out calculations in determining the feature graph. This is in contrast to many other approaches in which certain assumptions or calculations other than matrix calculations enables GPU resources to proportionately scale the calculations needed by the model and associated feature graph.

Moreover, features of the graph recovery system provide an approach that is unsupervised. Indeed, where many approaches require ground truth data to indicate known correlations between certain instances of the input data, the graph recovery system utilizes a fully connected neural network (for instance, a multilayer perceptron) along with a carefully designed sparsity inducing regularization terms, which enables the recovery system to learn feature correlations without having access to ground truth data and without involving supervision of the training process. Indeed, as will be discussed below, the input data may simply include a dataset with columns and rows and, by applying the neural graph revealers to the data, the graph recovery system learns complex dependencies between features as it is also a special type of probabilistic graphical model.

As illustrated in the foregoing discussion, the present disclosure utilizes a variety of terms to describe features and advantages of one or more embodiments of a graph recovery system. Additional detail will now be provided regarding the meaning of some of these terms.

As used herein, "input data" refers to a collection of input samples and associated features of the input samples. For example, input data may include a table of values including columns and rows in which the rows indicate a plurality of samples or subjects or other entities while each of the columns indicate features of the corresponding samples. As used herein, "features" or "sample features" refer interchangeably to characteristics or values that are descriptive or otherwise associated with a corresponding instance of an input sample. Examples of features and samples that may be included within a collection of input data are provided below.

As used herein, a "neural network" or "neural graph revealer" refers to a computer algorithm or model (e.g., a classification model, regression model, language model, etc.) that can be tuned or trained based on training input to approximate unknown functions or values. In one or more embodiments described herein, a neural network may refer to a fully connected neural network or a fully connected multi-layer perceptron having an architecture that learns or approximates functions that indicate connections between features of input data. In one or more embodiments, the neural network refers to a neural graph revealer configured to learn a sparse graphical model and fit a regression with nodes in both the input and output of the neural graph revealer representing the features of the given input data. It will be understood that while one or more embodiments described herein refer specifically to a neural network, features described in connection with a neural network may similarly apply to neural graph revealer(s).

As used herein, a "graph" or "feature graph" may refer to a data object in which features associated with a collection of samples are represented in a way that can be visualized to show direct connections (or direct dependencies) between various features. In one or more embodiments described herein, a feature graph refers to a visualization of features and associated connections by way of nodes that represent respective features and connections between the features while satisfying one or more sparsity constraints. More specifically, a sparse graph may include a set of features and corresponding connections that represent some subset of all possible connections between features of the input data. The subset of connections indicates direct connections as determined when applying a neural graph revealer system to the collection of samples and corresponding features.

Additional detail will now be provided regarding a graph recovery system in accordance with one or more example implementations. For example, FIG. 1 illustrates an example environment 100 including one or more computing devices 102 having a graph recovery system 104 implemented thereon. The computing device 102 may refer to a variety of different computing devices on which a graph recovery system 104 may be implemented. For example, the computing device 102 may include a mobile device such as a mobile telephone, a smartphone, a personal digital assistant (PDA), a tablet, or a laptop. Additionally, or alternatively, the computing device 102 may include a non-mobile device such as a desktop computer, server device, or other non-portable device. The computing device 102 (and other devices described herein) may include features and functionality described below in connection with FIG. 8.

As shown in FIG. 1, the computing device 102 includes a graph recovery system 104 implemented thereon. The graph recovery system 104 may include a number of components. For example, the graph recovery system 104 may include a data collection manager 106 and a neural network manager 108 having a multilayer perceptron 114 implemented thereon. The graph recovery system 104 may additionally include a graph presentation manager 110 and a data storage 112 including various types of data (e.g., feature data 116, model data 118). It will be understood that the multilayer perceptron 114 is provided by way of example and is not intended to be limiting of the only type of neural network architecture that may be used in accordance with one or more embodiments described herein.

While FIG. 1 shows an example environment 100 in which the components of the graph recovery system 104 are contained within a single computing device 102, one or more implementations may include components (or sub-components) implemented across multiple devices. As an example, features described in connection with generating a feature graph may be performed on separate computing devices from features associated with obtaining the input data and/or presenting the feature graph.

Additional details will now be discussed in connection with various components of the graph recovery system 104. For example, the data collection manager 106 might facilitate collection of input data in a variety of shapes and forms. For instance, in one or more embodiments, the data collection manager 106 obtains input data including a table of values in which each row or column represents a sample from a collection of input samples. In this example, columns (or rows) correspond to the identifiers of the respective samples and may include any number of features or feature values representative of characteristics of the associated sample(s).

In an illustrative example, a set of input data may refer to a table of samples and features in which the samples refer to subjects or patients that were born over a discrete period of time and corresponding features of attributes associated with the respective subjects. In this example, the input data includes a plurality of rows that each correspond to an individual born over the relevant period of time while each column provides a numerical value indicating an attribute associated with the corresponding individual. In this example, the features are specifically related to data surrounding the birth of the associated individual.

In contrast to the above example, the data collection manager may collect or otherwise obtain unstructured data and may generate a table or other structured form of the data. For example, the data collection manager may receive unstructured data and perform one or more operations to convert the data into a table of columns (or rows) and corresponding features that are associated with the respective samples. In one or more embodiments, the data collection manager extrapolates features to include within the respective rows (or columns) corresponding to the associated samples.

In one or more embodiments, the input data includes a complete representation of data in which a set of features are known for each of the corresponding samples of input data. In other implementations, the collected input data may include as many features of corresponding samples as are known when the input data is received. As an example, the input data may include a collection of samples and as many corresponding features as have previously been obtained for the associated samples with some of the samples having an incomplete set of feature data 116.

As noted above, the features may include a variety of data types. For example, the features of the input data may include numerical values, such as the example shown in FIG. 6. In some implementations, the features may include categorical data. The features may also include continuous data, discrete data, or any other form of data. In one or more embodiments, the features may include different types of data (e.g., numerical, categorical, continuous, discrete) associated with the same sample from a given input dataset.

Once the input data is collected and organized in a table or other data structure, the neural network manager 108 may proceed to determine direct connections that capture direct dependencies within the features of the input data. Indeed, as will be discussed below, the neural network manager 108 may design a neural network (e.g., a multilayer perceptron 114) that is configured to learn a sparse graphical model over a set of features. More specifically, the multilayer perceptron 114 may be configurable to be applied to a set of features of a corresponding dataset to determine a regression in which dependencies between features are determined and a regression model reflecting the dependencies is generated.

In one or more embodiments, the neural network manager 108 applies a neural network (e.g., the multilayer perceptron 114) to the input data to determine a regression model in which features of the input data are connected by a path to other features of the input data. More specifically, the neural network manager 108 may apply a neural network trained to fit a regression (e.g., learn a sparse graphical model over the data) with both the input and output of the NGR being the given input data while satisfying a number of sparsity constraints. Additional detail in connection with generating the regression model and satisfying the sparsity constraints will be discussed below in connection with FIGS. 3A-3B and FIG. 4.

As further shown in FIG. 1, the graph recovery system 104 includes a graph presentation manager 110. The graph presentation manager 110 may generate a graph representative of the regression model that is determined for a given set of input data. For example, the graph presentation manager 110 may generate a graph including nodes and edges that are representative of features and connections between the features of a given dataset. The graph presentation manager 110 may additionally cause the graph to be displayed or otherwise presented via a graphical user interface (GUI) on a computing device 102 (e.g., a client device, such as a personal computer or mobile device).

In one or more embodiments, the graph presentation manager 110 presents an interactive view of the graph. For example, in addition to generally presenting a display showing all nodes associated with corresponding features and a set of edges learned by the neural graph revealer that satisfies one or more sparsity constraints, the graph presentation manager 110 may include interactive features that enable a user to view attributes or other details of specific features and/or edges within the graph. In one or more embodiments, a user may select a node and view connections to other features and associated dependency function for the connections via a feature-specific view. Additional detail in connection with an example presentation will be discussed below in connection with FIGS. 5A-5B and FIG. 6.

Each of the components of the graph recovery system 104 may have access to data maintained in a data storage 112. As shown in FIG. 1, the data storage 112 includes a variety of information available to one or more of the components of the graph recovery system 104. The information within the data storage 112 may be stored on a same device as other components of the graph recovery system 104 (as shown in FIG. 1) or, alternatively, some or all of the data within the data storage 112 may be stored across different devices. In either example, the data from the data storage 112 is accessible to some or all of the components of the graph recovery system 104.

As shown in FIG. 1, the data storage 112 may include feature data 116. The feature data 116 may include any information related to features that are associated with corresponding samples from the input data. The feature data 116 may be different depending on the domain of the samples. For example, where samples are related to hospital patients, features may refer to hospital-related metrics, such as age, demographic, symptoms, diagnoses, mortality rates, etc. As another example, where samples refer to a domain of anaerobic digestion, the samples may refer to various samples taken from a digester on different dates while the features refer to counts of different microbes present in each sample. Indeed, this illustrates the possibility of a wide variety of data and data types that differ significantly between different information domains.

As further shown in FIG. 1, the data storage 112 may include model data 118. The model data 118 may include any information associated with the neural network that may be used in determining a regression or otherwise generating a regression model that fits a given set of input data. The model data 118 may include information about weights, layers, connections, and other information that relates to the model(s) (e.g., the multilayer perceptron 114, the resulting regression model) and how the model(s) may be implemented with respect to a given set of input data.

Figure 2:
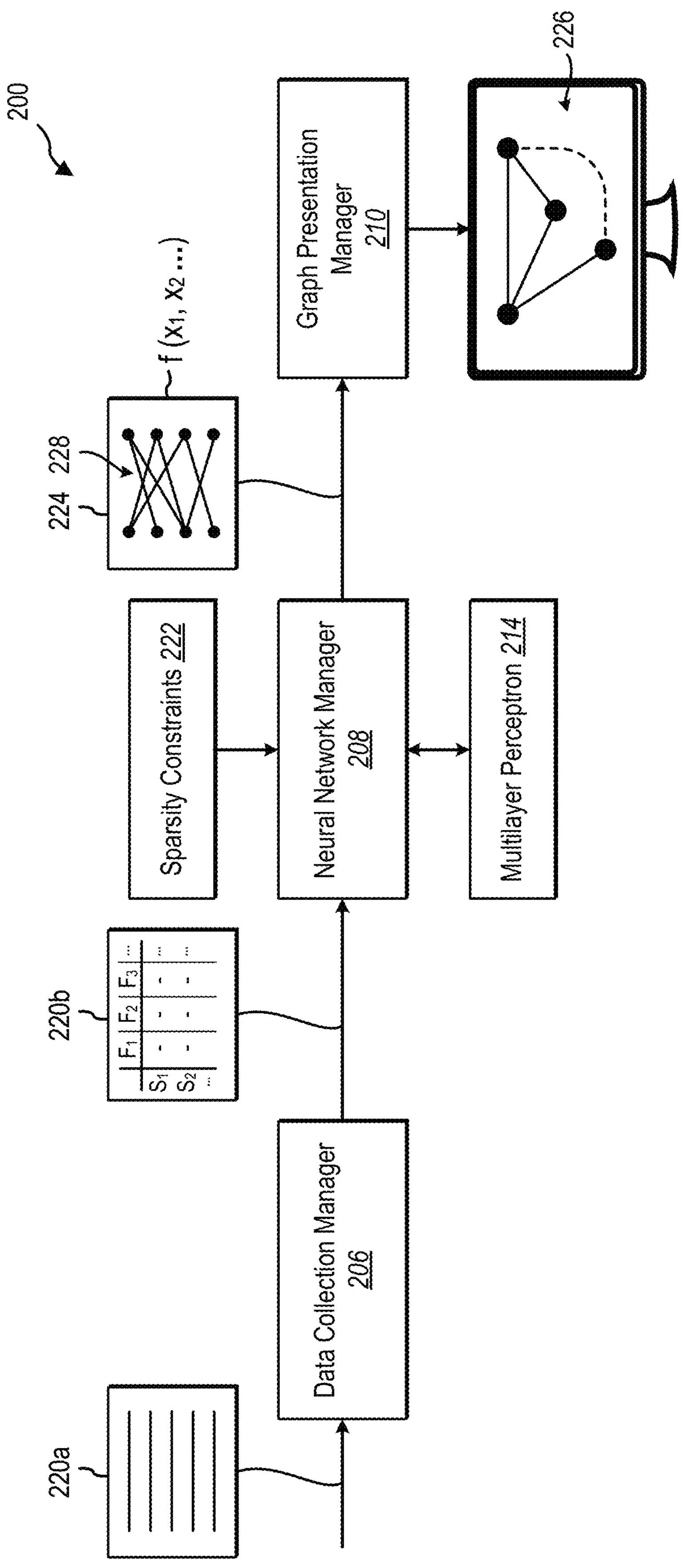
FIG. 2 illustrates an example workflow showing an implementation in which a regression model learns a sparse graphical model over the data to generate and present a graphical representation of the features of the input data.

FIG. 2 illustrates an example workflow 200 showing a possible implementation of the graph recovery system 204 in accordance with one or more embodiments. It will be appreciated the components shown in FIG. 2 may have similarly features as discussed above in connection with similar components shown in FIG. 1.

As shown in FIG. 2, the data collection manager 206 may receive or otherwise obtain input data, such as unstructured input data 202*a*. In this example, the unstructured input data 202*a* refers to unstructured data or data that is not necessarily organized in rows and columns. In the example shown in FIG. 2, the data collection manager 206 organizes the unstructured input data 220*a* in rows or columns to generate a collection of input data 220*b* having a form that can be analyzed by a neural network (e.g., the multilayer perceptron 214). For example, the data collection manager 206 may generate a table of samples and associated features to provide as input data 220*b* to the neural network.

As shown in FIG. 2, the neural network manager 208 may receive the collection of input data 220*b* for further processing. In particular, the neural network manager 208 may utilize a multilayer perceptron 214 to train a regression model 224 for the input data 220*b* in which connections 228 between features of the input data 220*b* are included. The connections 228 may include a combination of positive and negative connections (e.g., connections 228 associated with positive and negative correlations).

As shown in FIG. 2, in creating the regression model 224, the neural network manager 208 may consider a number of sparsity constraints 222. In one or more embodiments, the sparsity constraints 222 are user-defined constraints, such as a desired number or percentage of edges within a resulting feature graph. The sparsity constraints 222 may also be default constraints, such as a requirement that no feature is self-dependent (e.g., that the resulting regression model does not associate a feature with itself or that there is no path from the node corresponding in the given feature in the input layer to the node representing the same feature in the output layer). Additional information in connection with these sparsity constraints 222 will be discussed below.

As will be discussed in further detail below, the neural network manager 208 may apply the multilayer perceptron 214 to the input data 220*b* to train a model that reflects dependencies found within the input data 220*b*. More specifically, the neural network manager 208 may apply the neural network (e.g., a fully connected multilayer perceptron 214) to the collection of samples and associated sample features to learn a regression model 224 that learns a set of dependencies between input features and output features while satisfying the sparsity constraints 222. As noted above, learning dependencies between the input features and associated output features includes determining direct connections 228 between pairs of features from the set of input features using a probabilistic concept of conditional independence.

While the direct connections 228 refer to dependencies between various features included within the input data 220*b*, in one or more embodiments described herein, the direct corrections 228 are associated with paths between features via one or multiple hidden layers of the neural network. For example, where the multilayer perceptron 214 includes multiple hidden layers, the existence of a path indicates the presence of a direct connection 228 between features, without necessarily indicating how the path traverses each of the layers within the multilayer perceptron 214. While FIG. 2 shows an example in which a correlation graph (e.g., graph 226) is generated based on an application of the neural network to a collection of input data 220*b* based on sparsity constraints 222, where a user wishes to see additional or fewer connections 228, for example, or where additional features become available, it may be advantageous to optionally allow a user to modify one or more sparsity constraints 222 to increase or decrease a number of connections 228 that appear within a graph representation (e.g., graph 226) of the input data 220*b*.

In this example, a user or other entity may modify a sparsity constraint 222 that uses thresholding to limit the number of direct correlations 228 between respective features in the input data 220*b*. This may include modifying the sparsity constraints 222 to limit a number of direct connections 228 in the regression model 224. In one or more embodiments, this includes modifying the sparsity constraints 222 to increase a number of direct connections 228 in the regression model 224. In response to modifying the sparsity constraint 222, the neural network manager 208 may reapply the neural network to the input data 220*b* to learn a refined or modified regression model 224 in which input features are dependent on output features while satisfying the modified sparsity constraint 222.

Upon learning the regression model 224, the neural network manager 208 may provide the regression model 224 to the graph presentation manager 210 for further processing. The graph presentation manager 210 may generate a graph representation (e.g., a file that can be rendered as a graph 226) from the regression model 224 along with its probabilistic graphical representation. For example, the graph presentation manager 210 may generate a graph 226 including nodes representative of features of the regression model 224 and edges representative of functions indicating dependencies between the respective features of the input data 220*b*.

Upon generating the graph 226, the graph presentation manager 210 may present the graph 226. For example, the graph presentation manager 210 may render a view or other visualization of the graph 226 for presentation via a GUI of a client device. In one or more embodiments, this includes presenting a display of the graph 226 within a browser or other application that provides access to functionality of the graph presentation manager 210 on the cloud or other remote device. In one or more embodiments, the graph presentation manager 210 presents the graph 226 by providing a file of the graph 226 for local display on the GUI of the client device.

Figure 3A:
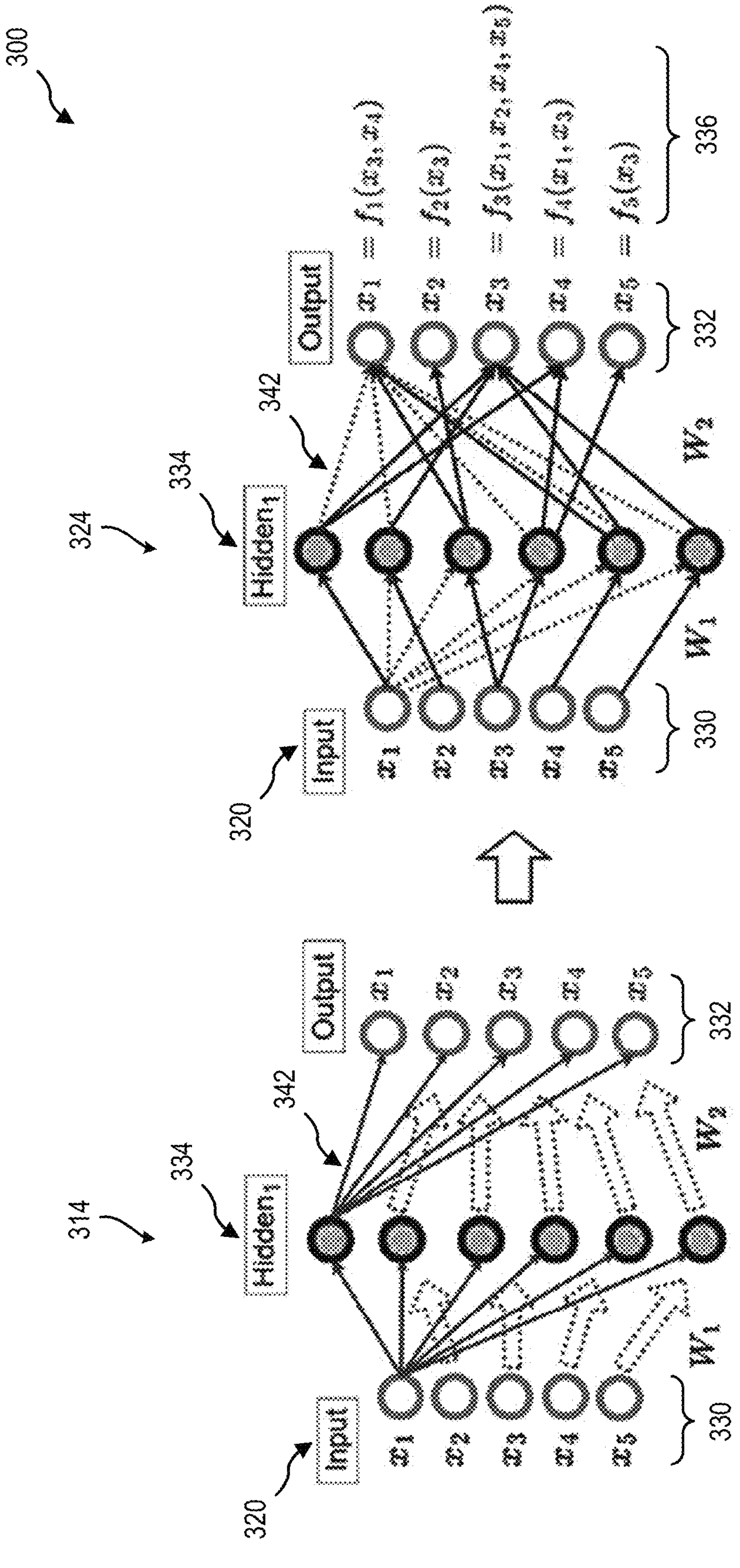
FIGS. 3A-3B illustrate another example workflow in which a fully connected neural network is applied to features of input data to determine direct connections between features of the input data in accordance with sparsity constraints.
Figure 3B:
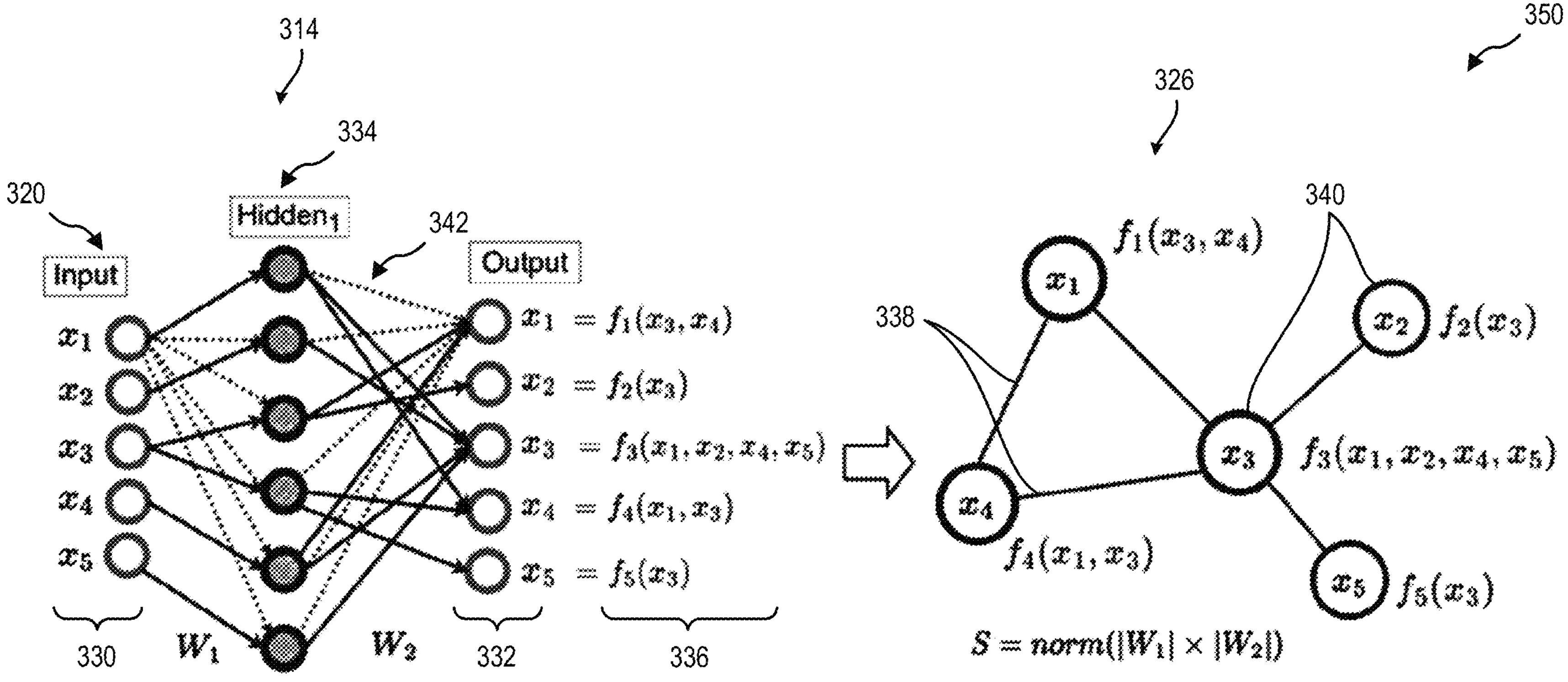

FIGS. 3A-3B illustrate an example implementation 300 in which a fully connected neural network 314 is applied to a set of input data 320 to generate a feature graph 326 in accordance with one or more embodiments described herein.

In particular, FIG. 3A illustrates an example implementation 300 in which a neural network 314 (e.g., a fully connected multilayer perceptron) is applied to a collection of input data 320 to generate an optimized regression model 324 (e.g., an optimized neural graph revealer (NGR)) that indicates dependencies between various features of the input data 320. FIG. 3B illustrates an example workflow 350 in which an optimized regression model 324 is used to generate a feature graph 326 in which features and connections are represented via a presentation of nodes 341 and edges 338 that may be displayed on a GUI.

In the illustrated example, a fully connected neural network 314 (e.g., a multilayer perceptron) is provided with both input features 330 and output features 332 represented as x's. Viewing the neural network 314 as a multitask learning framework indicates that the output features 332 are dependent on all the input features 330 in the initial fully connected framework. Indeed, as shown in FIG. 3A, the fully connected neural network 314 shows each input feature 330 being connected to each output feature 332 (e.g., by way of the hidden layer 334 being connected to each input feature 330 and output feature 332). It will be appreciated that while the example neural network 314 shows five variables with a single hidden layer 334, one or more implementations include a fully connected framework including any number of connected (e.g., fully connected) hidden layers 334 that are connected to any number of variables, thus providing the possibility of a very rich and complex functional representation of the various features.

Indeed, the bigger the size of the neural network 314 (e.g., number of hidden layers 334, hidden unit dimensions), the richer the functional representation of the features will be (e.g., output functions 336). As shown in FIGS. 3A-3B, a sparse dependency graph (e.g., feature graph 326) between the input features 330 and output features 332 of the neural network 314 reduces to a normalized weight matrix product, which may be expressed as $S_G=\text{norm}(|W_1|\times|W_2|)$. As shown in FIG. 3B, for the sake of clarity, not all weights of the neural network 314 are necessarily shown. It will be noted that because the neural network 314 applied to the input data 320 is capable of analyzing complex distributions, the features described herein in connection with generating an optimized regression model 324 may be scalable to a large number of data points while also maintaining sparsity. This is a significant improvement over conventional models that are limited to specific types of data or that cannot scale to larger datasets that include complex distributions.

In one or more embodiments, the graph recovery system applies the neural network 314 to the collection of input data 320 and fits a regression model 324 to the input data 320 to determine paths 342 through the neural network 314 between the various features. As shown in FIG. 3A, the resulting output includes a regression model 324 in which paths 342 through the neural network 314 may be represented as output functions 336 for each of the features. In particular, the output functions 336 may include formulas that are functions of one or more of the input features 330. In this example, each output feature 332 is expressed as a function of a set of one or more input features 330.

As shown in FIG. 3A, the optimized regression model 324 includes a series of formulas for each of the features in which the features are expressed as functions of other features from the input data 320. More specifically, in connection with the resulting feature graph 326, each feature (or graph node 340) is expressed as a function of immediate (one-hop) neighbor features. Thus, as will be discussed below, each path 342 through the neural network 314 may be expressed as a formula between two directly connected features. In the recovered feature graph 326, this may be displayed as neighboring nodes 340 that are connected via an edge.

In generating the optimized regression model 324, the graph recovery system considers a number of parameters and constraints. For example, a first sparsity constraint may be a restriction that none of the features should have self-referencing paths 342 through the neural network 314. For instance, a first feature at an input should not have a path 342 to the first feature at the output, a second feature should not have a path 342 to the second feature, and so on. Indeed, as will be discussed below, this may be accomplished by setting or otherwise minimizing values of an adjacency matrix to zero. As shown in the illustrated example, self-referencing paths 342 are indicated by dashed lines.

In addition to a sparsity constraint eliminating self-referencing paths 342 in a resulting optimized regression model 324, the graph recovery system may additionally impose one or more sparsity constraints that reduce or otherwise minimize a number of paths 342 within the resulting optimized regression model 324. Indeed, where many conventional approaches impose sparsity constraints on values of weights that are applied to certain feature values, the graph recovery system imposes the sparsity constraint(s) on the paths 342 between the input features 330 and output features 332 that connect the features via the neural network 314. As shown in the illustrated examples, the direct connections are indicated as solid lines while non-direct connections (e.g., paths 342 that are removed from the optimized regression model 324) are indicated by dashed lines.

As will be discussed in further detail below (e.g., in connection with the equation shown in FIG. 4), in one or more embodiments, the nodes in the regression model 324 include rectified linear unit functions (ReLUs) configured to jointly discover feature dependency graph constraints while fitting the optimized regression model 324 on the set of input features 330 with the input and output of the NGR being the given input data 320. In one or more embodiments, learning the regression model 324 includes recovering an adjacency matrix indicating direct connections between input features 330 and respective output features 332 while satisfying the one or more sparsity constraints. Each direct connection indicated in the adjacency matrix is associated with a subset of paths 342 between a subset of input features from the set of input features 330 and respective output features 332 while satisfying the one or more sparsity constraints. Moreover, in one or more embodiments, learning the regression model 324 includes learning a function 336 for each feature from the set of output features 332 by fitting a regression with both the input and output of the NGR being the given input data 320.

Additional information will now be discussed in connection with an example approach to generating an optimized graph. In particular, this approach will be discussed in connection with the algorithm 400 shown in FIG. 4, in which graph revealers are trained in accordance with one or more embodiments described herein.

As shown in FIG. 4, a neural network with "L" number of layers having a set of weights ($W=\{W_1, W_2, \ldots, W_L,\}$ and biases $\mathcal{B}=\{b_1, b_2, \ldots, b_L\}$ as $f_{W,\mathcal{B}}(\cdot)$ with non-linearity not mentioned explicitly. In this implementation, a rectified linear unit (ReLU) is used within the disclosed framework. In one or more embodiments, other forms of non-linearity may be used. Applying the neural network to the input $X_D$ evaluates the following mathematical expression $f_{W,\mathcal{B}}(X_D)=\text{ReLU}(W_L\cdot(\ldots(W_2\cdot\text{ReLU}(W_1\cdot X_D+b_1)+b_2)\ldots)+b_L)$. The dimensions of the weights and biases may be chosen such that the neural network input and output are units equal to "D" with the hidden layers dimension (H) remaining a design choice. In this example, an initial choice may be set as H=2|D|, which may be adjusted based on the loss on validation data.

One task in optimizing the regression model is to design the neural graph revealer objective function such that it can jointly discover the feature dependency graph constraints (e.g., the sparsity constraints restricting self-correlating features and reducing a number of paths through the neural network) while fitting the regression on the input data. In one or more embodiments, it is observed that the product of weights of the neural network (Snn) is expressed with the following equation:

$$S_{nn} = \prod_{l=1}^{L} |W_1| = |W_1| \times |W_2| \times \ldots \times |W_L|$$

This equation provides path dependencies between input and output features. It is noted that if $S_{nn}(x_i, x_0)=0$, then the output (xo) does not depend on the input (xi). This property of the multilayer perceptron is used to model the constraints along with finding a set of parameters $\{W, \mathcal{B}\}$ that minimize the regression loss expressed as the Euclidian distance between $X_D$ and $f_{W,\mathcal{B}}(X_D)$.

In this example, a first optimization objective may be expressed as follows:

$$\underset{W,\mathcal{B}}{\arg\min} \sum_{k=1}^{M} \| X_D^k - f_{W,\mathcal{B}}(X_D^k) \|^2,$$

$$\text{s.t. } sym(S_{nn}) * S_{diag} = 0$$

where $$\text{sym}(S_{nn}) = (\|S_{nn}\|_2 + \|S_{nn}\|_2^T)/2$$

converts the path norm obtained by the neural; network weights product, $$S_{nn} = \prod_{i-1}^{L} |W_l|,$$

into a symmetric adjacency matrix in which $S_{diag} \in \mathbb{R}^{D \times D}$ represents a matrix of zeroes except the diagonal entries being set to ones. An operation Q*V may represent a Hadamard operator which does an element-wise matrix multiplication between the same dimension matrices Q and V.

In the above example, a first constraint (e.g., avoiding self-referencing dependencies) may be included as the second term in the optimization objective function expressed above. In addition to the first constraint, the graph recovery system may introduce a second constraint to introduce sparsity in the path norms.

In this example, the sparsity constraint (e.g., the second constraint) may include a normalization term $\|\text{sym}(S_{nn})\|_1$, which introduces sparsity in the path norms. Thus, including the constraints as Lagrangian terms and constants (λ, γ) which act as a tradeoff between fitting the regression term and satisfying corresponding constraints to recover a valid graph dependency structure (e.g., the regression model). In one or more embodiments, the resulting optimization function (A second optimization function) may be expressed as follows:

$$\underset{W,\mathcal{B}}{\arg\min} \sum_{k=1}^{M} \| X_D^k - f_{W,\mathcal{B}}(X_D^k) \|^2 + \lambda \| sym(S_{nn}) * S_{diag} \|_1 + \gamma \| sym(S_{nn}) \|_1$$

in which a first parameter (The minimization summation term) is the regression parameter, the second parameter ($\lambda\|\text{sym}(S_{nn})*S_{diag}\|_1$) is a first sparsity constraint that prevents each feature from having a self-referencing path to itself, and the third parameter ($\gamma\|\text{sym}(S_{nn})\|_1$ is a second sparsity constraint the ensures a measure of sparsity within the resulting regression model.

In the above example, and consistent with one or more embodiments described herein, the graph recovery system starts with a fully connected graph and introduces the Lagrangian terms above to introduce sparsity in the graph. The first optimization function above describes a procedure to learn the neural graph recovery architecture based on optimizing the second optimization function above. It is noted that the optimization and graph recovered depends on choices of the constants (λ, γ). Since the loss function contains multiple terms, a loss balancing technique may be utilized to determine initial values of the constraints that provide an optimal measure of sparsity. While running the optimization, based on the regression loss value on held-out validation data, the values of the penalty constants may be appropriately chosen.

As noted above, features and functionality of the graph recovery system discussed above accomplish a number of benefits. For example, by using a multilayer perceptron when applying the neural network to the input data, the graph recovery system is able to generate a rich and more complex representation of a wide variety of datasets.

As another example, by applying the multilayer perceptron or other equivalent fully connected network, the graph recovery system is able to generate an equation without relying on ground truth data. Rather, the graph recovery system fits a regression model to the feature values to determine functions representative of the dependencies between the various features. Learning the dependencies (e.g., complex dependencies) between the features is a probability graphical model that can be performed without supervision, thus providing another benefit over conventional approaches that often require user supervision.

As noted above, the multilayer perceptron provides a scalable approach to evaluating and optimizing functions for collections of input data having a large number of samples and a large number of associated features. Indeed, because applying the multilayer perceptron to the input data involves performing potentially a large number of matrix operations, this type of calculation may be scaled using graphical processing unit (GPU) resources in addition to other processing resources. Indeed, due to the nature of calculations described herein, the GPUs can provide enhanced computing capabilities that provide scalability over conventional approaches that rely on other types of recovery algorithms.

In addition, the neural graph revealers (NGR) architecture is an instance of a special program model that may be queried for other applications. For example, in addition to a feature graph that provides a visualization of how features are connected, because the NGR approach described herein provides underlying distributions, the feature graph may become a graphical model that can be queried to learn additional insights about the relevant dataset, perform other operations such as inference (determining maximum a-posteriori values or full conditional distributions given evidence on a subset of features) and sampling.

Figure 5B:
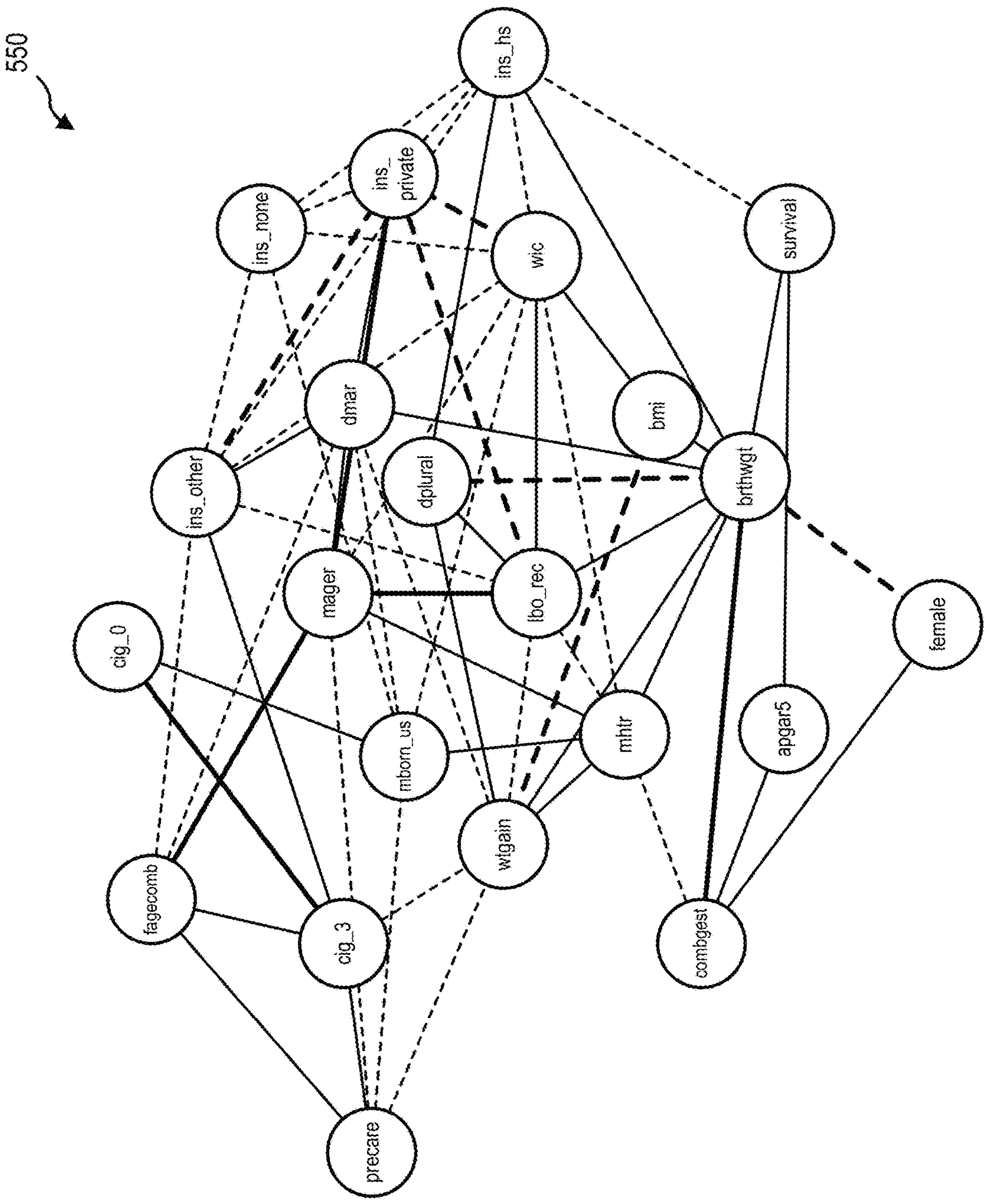

Additional detail will now be discussed in connection with an example collection of input data and a corresponding feature graph generated from the input data in accordance with one or more embodiments described herein. In particular, FIG. 5A illustrates an example data table 500 including a collection of samples and associated features. In addition, FIG. 5B illustrates an example feature graph 550 representative of correlations between the features included within the data table 500.

In this example, the data table 500 includes a plurality of rows that indicate a sample from the input data. More specifically, each row in the data table 500 corresponds to an individual born within a period of time. As shown in FIG. 5A, each of the columns correspond to a particular feature of the individual(s). In the example shown, each feature value may be a numeric value associated with the corresponding individual. In another example, each feature value may be a string value such as "yes," "no," and/or "unknown" (e.g., corresponding to category such as a mother's marital status). In one or more implementations, these non-numerical values may be converted to corresponding numerical values. As shown in FIG. 5A, there may be a significant number of features associated with each sample.

By way of example, the table 500 shown in FIG. 5A illustrates a collection of features associated with individuals born during a particular year. As shown in FIG. 5A, the features may include a mother's age, a father's age, an order of the child (e.g., "3" corresponding to two older siblings), a month when the mother started prenatal care, an indication of whether one or more of the parents participated in a specific program, whether the mother smoked, as well as an indication of whether the smoking happened during a first, second, or third trimester. The features may additionally include birth weight, gestational age at birth, whether the birth was a plural birth, etc. Indeed, it will be appreciated that the input data may include any number of features.

Moreover, while FIG. 5A illustrates an example in which all of the features are represented by numerical values, other implementations may include non-numerical values. For example, the features may be represented by categorical, discrete, continuous, or other type of data that may be used to represent various features associated with corresponding data samples.

In accordance with one or more embodiments described above, the graph recovery system may apply a neural network to the input data to generate the feature graph 550 shown in FIG. 5B. Indeed, in accordance with one or more embodiments described above, the graph recovery system may fit a regression with both the input and output of the NGR being the given input data, as shown in FIG. 5A, to determine a formula for each of the figures indicating paths through the neural network that define direct connections between features while satisfying one or more sparsity constraints.

The resulting feature graph 550 is shown in FIG. 5B. As shown in FIG. 5B, a user may gain a significant number of insights about the features, some of which are obvious, but many of which are less obvious. By way of example, the feature graph 550 shows a dependency between a mother's place of birth and a corresponding height. One or more of these features may exhibit dependency on birthweight, which may be highly dependent on gestational age. Survival may depend on birthweight. The age of parents may be correlated to other features.

As shown in FIG. 5B, the feature graph may include only some of the dependencies that exist between various features. Indeed, based on the sparsity constraints, the graph recovery system may generate a graph that includes fewer connections than an initial number of connections when the fully connected neural network is first applied to the input data. In one or more embodiments, the sparsity constraints (e.g., a first constraint preventing features from being self-correlated, a second constraint reducing a number of direct connections/paths through the neural network) may determine or otherwise influence the total number of edges that are shown in the resulting feature graph.

Figure 6:
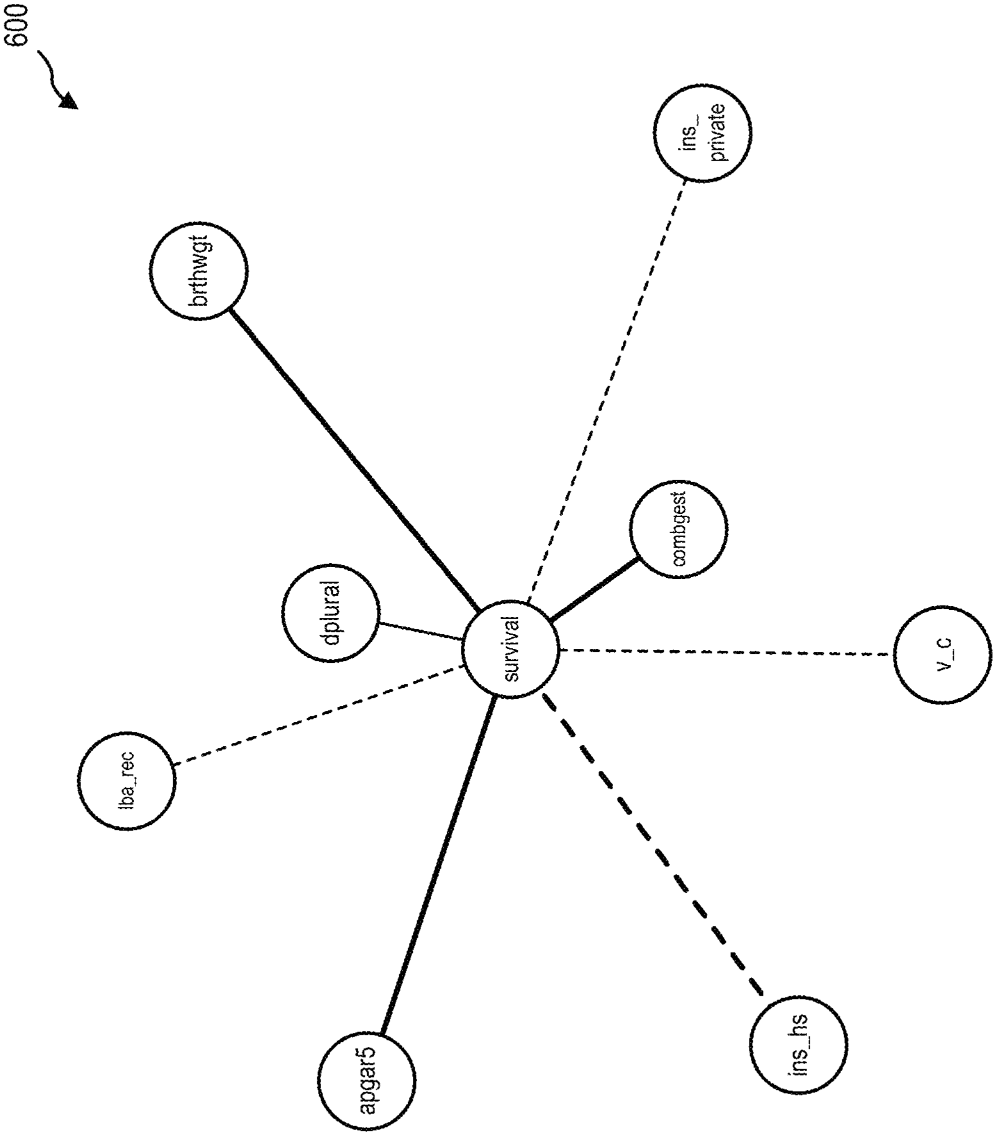
FIG. 6 illustrates an example presentation of a portion of a recovered graph in accordance with one or more embodiments.

In addition to generally providing a presentation of a graph, the graph recovery system may additionally include functionality that enables a user to interact with one or more nodes of the graph. For example, in one or more embodiments, a user may select a node to view a node specific view 600 in which direct connections that are associated with the specific node are presented. FIG. 6 provides an example presentation showing additional insight about the "survival" feature.

As shown in FIG. 6, the survival feature node is presented at a center of the presentation with direct connections shown between the survival node and other nodes within the feature graph 550. In the displayed example, the survival feature may have a strong positive dependence on features such as birthweight, an Apgar score, and other features. Conversely, the survival feature may depend negatively to features such as not having health insurance (or a particular carrier of insurance), or other factors. Note that dependencies that are neither positive nor negative, or positive for some ranges of a feature and negative for other ranges are also possible.

Figure 7:
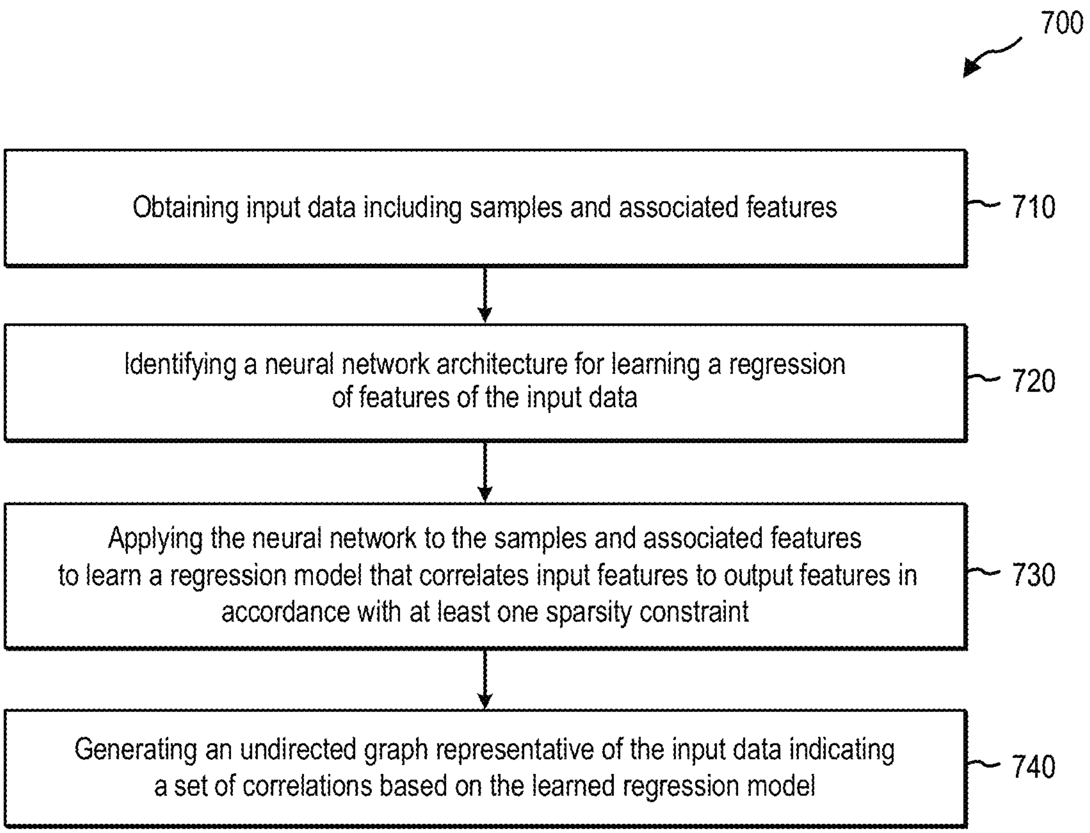
FIG. 7 illustrates a series of acts for recovering and presenting a graph based on a collection of input data in accordance with one or more embodiments.

Turning now to FIG. 7, this figure illustrates an example flowchart including a series of acts 700 for determining a regression model for a set of input data and generating/presenting a graph showing correlations between features of the input data. While FIG. 7 illustrates acts according to one or more embodiments, alternative embodiments may omit, add to, reorder, and/or modify any of the acts shown in FIG. 7. The acts of FIG. 7 can be performed as part of a method. Alternatively, a non-transitory computer-readable medium can include instructions that, when executed by one or more processors, cause a computing device to perform the acts of FIG. 7. In still further embodiments, a system can perform the acts of FIG. 7.

As shown in FIG. 7, the series of acts 700 may include an act 710 of obtaining input data including samples and associated features. The sample features may include two or more types of data. For example, the sample features may include two or more of numerical, categorical, discrete, and continuous data.

The series of acts 700 may also include an act 720 of identifying a neural network architecture for learning a regression of features of the input data. For example, the neural network may be trained to learn a regression for features of the input data. The neural network may be (e.g., initially) a fully connected neural network. The neural network may be a fully connected multi-layer perceptron. In one or more embodiments, the neural network includes two or more hidden layers having a plurality of paths between a given set of input features and a given set of output features corresponding to the given set of input features. Learning dependencies between the set of input features and the set of output features may include determining direct connections between pairs of features from the set of input features. For example, each direct connection may be associated with a path between an input feature and a corresponding output feature within the neural network. For example, feature Xi is not directly connected to feature Xj if and only if features Xi and Xj are conditionally independent given all other features in the distribution learned based on the input dataset.

The series of acts 700 may also include an act 730 of applying the neural network to the samples and associated features to learn a regression model that correlates input features to output features in accordance with at least one sparsity constraint. For example, the set of input features may be dependent on the set of output features by determining direct connections between pairs of features from the set of input features. In one or more embodiments, the one or more sparsity constraints include a sparsity constraint restricting a number of direct connections that gives direct dependencies between the respective features. The sparsity constraints may include a sparsity constraint restricting any input feature from being directly connected via a path through the neural network with a same input feature. The sparsity constraint that restricts a number of paths through the neural network representing direct dependencies between respective features may be modified. For example, the sparsity constraint may be modified to reduce a number of direct connections in the regression model. In another example, the sparsity constraint may be modified to increase a number of paths through the neural network in the regression model. In one or more embodiments, the neural network may be reapplied to learn a refined regression that correlates the set of input features to the set of output features while satisfying the modified sparsity constraint.

In one or more embodiments, the nodes in the regression model include rectified linear unit functions or other nonlinear functions configured to jointly discover feature dependency graph constraints while fitting the regression model on the set of input features with both the input and output of the neural network being the obtained data. Learning the regression model may include recovering an adjacency matrix indicating direct connections between input features and respective output features while satisfying the one or more sparsity constraints. For example, each connection indicated in the adjacency matrix may be associated with a subset of paths between an input feature and respective output features. In one or more embodiments, learning the regression model includes learning a function for each feature from the set of output features by fitting a regression to the obtained data.

The series of acts 700 may further include an act 740 of generating an undirected graph representative of the input data indicating a set of correlations based on the learned regression model. For example, the direct connections may be represented as edges in the undirected graph. The presentation of the undirected graph may be displayed via a graphical user interface of a computing device. In one or more embodiments, the undirected graph may be regenerated, for example, based on modifying one or more sparsity constraints and/or reapplying the neural network training corresponding with modifying the sparsity constraints as described herein. The presentation of the regenerated undirected graph may be displayed via a graphical user interface of the computing device.

Figure 8:
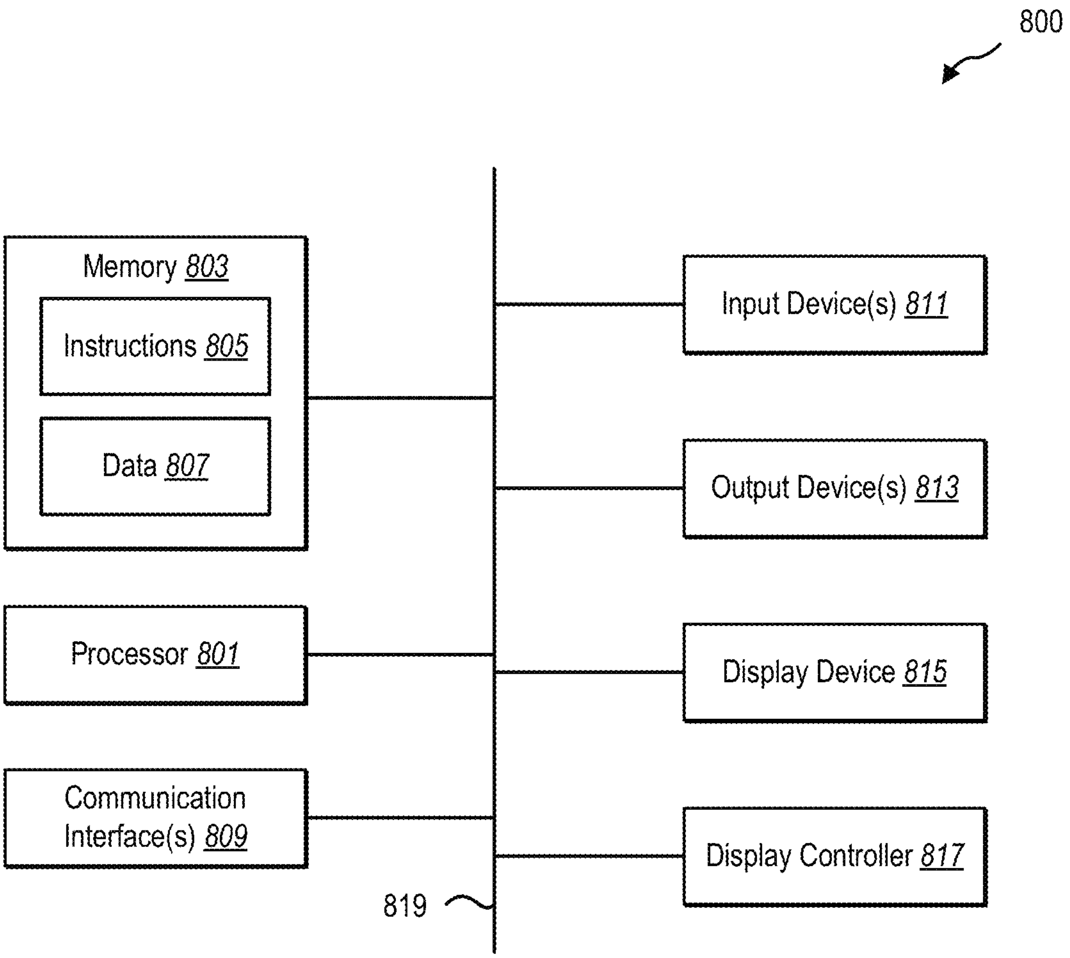
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used. In one or more embodiments, the computer system 800 further includes one or more graphics processing units (GPUs), which can provide processing services related to both entity classification and graph generation.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular datatypes, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for recovering undirected graphs, comprising:

obtaining data including a collection of samples and associated sample features;

identifying a neural network configured to receive input features of a given set of samples and learn a regression for the input features, the neural network comprising a fully connected neural network including one or more hidden layers having a plurality of paths between a given set of input features and a given set of output features corresponding to the given set of input features;

applying the neural network to the collection of samples and associated sample features to learn a regression model that learns dependencies between a set of input features and a set of output features while satisfying one or more sparsity constraints, at least one of the one or more sparsity constraints being applied to the neural network to reduce a number of dependencies represented within the regression model; and generating an undirected graph representative of the collection of samples indicating a set of dependencies between the sample features associated with the collection of samples.

2. The method of claim 1, wherein the sample features include two or more types of data including two or more of numerical, categorical, discrete, and continuous data.

3. The method of claim 1, wherein the neural network is a fully connected multi-layer perceptron.

4. The method of claim 1, wherein learning dependencies between the set of input features and the set of output features includes determining direct connections between pairs of features from the set of input features.

5. The method of claim 1, wherein the one or more sparsity constraints include a sparsity constraint restricting any input feature from being directly connected via a path through the neural network with a same input feature.

6. The method of claim 1, wherein the one or more sparsity constraints include a sparsity constraint restricting a number of paths that give direct dependencies between the respective features.

7. The method of claim 6, further comprising:

modifying the sparsity constraint restricting a number of paths through the neural network representing direct dependencies between respective features; and reapplying the neural network to learn a refined regression that correlates the set of input features to the set of output features while satisfying the modified sparsity constraint.

8. The method of claim 7, wherein modifying the sparsity constraint includes reducing a number of direct connections in the regression model.

9. The method of claim 1, wherein the nodes in the regression model include rectified linear unit functions or other nonlinear functions configured to jointly discover feature dependency graph constraints while fitting the regression model on the set of input features with both the input and output of the neural network being the obtained data.

10. The method of claim 1, wherein learning the regression model includes recovering an adjacency matrix indicating direct connections between input features and respective output features while satisfying the one or more sparsity constraints.

11. The method of claim 1, wherein learning the regression model includes learning a function for each feature from the set of output features by fitting a regression to the obtained data.

12. The method of claim 1, wherein the trained regression model represents the underlying probabilistic distribution and supports probabilistic inference and sampling.

13. A system, comprising:

at least one processor;

memory in electronic communication with the at least one processor; and instructions stored in the memory, the instructions being executable by the at least one processor to:

obtain data including a collection of samples and associated sample features;

identify a neural network configured to receive input features of a given set of samples and learn a regression for the input features, the neural network comprising a fully connected neural network including one or more hidden layers having a plurality of paths between a given set of input features and a given set of output features corresponding to the given set of input features;

apply the neural network to the collection of samples and associated sample features to learn a regression model that correlates a set of input features to a set of output features while satisfying one or more sparsity constraints, at least one of the one or more sparsity constraints being applied to the neural network to reduce a number of dependencies represented within the regression model; and generate an undirected graph representation of the collection of samples indicating a set of correlations between the sample features associated with the collection of samples.

14. The system of claim 13, wherein the neural network is a fully connected multi-layer perceptron.

15. The system of claim 13, wherein correlating the set of input features to the set of output features includes determining direct connections between pairs of features from the set of input features, and the one or more sparsity constraints include a sparsity constraint restricting any input feature from being directly connected via a path through the neural network with a same input feature.

16. The system of claim 13, further comprising instruction being executable by the at least one processor to:

modify a sparsity constraint restricting a number of paths through the neural network representing direct correlations between respective features; and reapply the neural network to learn a refined regression that correlates the set of input features to the set of output features while satisfying the modified sparsity constraint.

17. The system of claim 13, wherein learning the regression model includes learning a function for each feature from the set of output features by fitting a regression to the obtained data.

18. A method for recovering undirected graphs, comprising:

obtaining data including a collection of samples and associated sample features;

identifying a neural network configured to receive input features of a given set of samples and learn a regression for the input features, the neural network comprising a fully connected neural network including one or more hidden layers having a plurality of paths between a given set of input features and a given set of output features corresponding to the given set of input features;

applying the neural network to the collection of samples and associated sample features to learn a regression model that correlates a set of input features to a set of output features while satisfying one or more sparsity constraints, at least one of the one or more sparsity constraints being applied to the neural network to reduce a number of dependencies represented within the regression model;

generating an undirected graph representative of the collection of samples indicating a set of correlations between the sample features associated with the collection of samples; and causing a presentation of the undirected graph to be displayed via a graphical user interface of a computing device.

19. The method of claim 18, wherein the neural network is a fully connected multi-layer perceptron.

20. The method of claim 18, wherein the one or more sparsity constraints include at least one of:

restricting any input feature from being directly connected via a path through the neural network with a same input feature; or restricting a number of direct correlations that gives direct dependencies between the respective features.

* * * * *